United States Patent
Akita et al.

(10) Patent No.: US 9,294,025 B2
(45) Date of Patent: Mar. 22, 2016

(54) FIELD WINDING ROTATING ELECTRICAL MACHINE AND METHOD FOR CONTROLLING FIELD CURRENT OF A FIELD WINDING ROTATING ELECTRICAL MACHINE

(75) Inventors: Kenichi Akita, Chiyoda-ku (JP); Masato Mori, Chyoda-ku (JP); Mitsunori Tabata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/386,077

(22) PCT Filed: May 15, 2012

(86) PCT No.: PCT/JP2012/062401
§ 371 (c)(1),
(2), (4) Date: Sep. 18, 2014

(87) PCT Pub. No.: WO2013/171843
PCT Pub. Date: Nov. 21, 2013

(65) Prior Publication Data
US 2015/0048773 A1 Feb. 19, 2015

(51) Int. Cl.
*H02P 7/06* (2006.01)
*H02P 7/282* (2006.01)
(Continued)

(52) U.S. Cl.
CPC ............... *H02P 7/282* (2013.01); *B60L 11/12* (2013.01); *H02P 9/30* (2013.01); *H02P 9/48* (2013.01);
(Continued)

(58) Field of Classification Search
CPC ...................................... H02P 7/282
USPC ............ 318/141, 146, 400.01, 471, 472, 430, 318/432, 437, 527, 528, 529, 530, 531, 714, 318/716, 717, 718, 719, 720, 721, 799, 800, 318/801, 811; 180/53.1, 65.285; 322/68, 71
See application file for complete search history.

(56) References Cited

U.S. PATENT DOCUMENTS 7,402,968 B2 * 7/2008 Wada et al. .................. 318/146
2006/0038406 A1 2/2006 Hino et al.

FOREIGN PATENT DOCUMENTS

| JP | 10-309100 A | 11/1998 | |
|---|---|---|---|
| JP | 2002-237412 A | 8/2002 | |
| JP | 2005-237049 A | 9/2005 | |
| JP | 2005237049 A * | 9/2005 | ............. H02P 7/282 |
| JP | 2006-060922 A | 3/2006 | |
| JP | 2009-098091 A | 5/2009 | |

(Continued)

OTHER PUBLICATIONS

International Search Report of PCT/JP2012/062401 dated Aug. 28, 2012.

*Primary Examiner* — Antony M Paul
(74) *Attorney, Agent, or Firm* — Sughrue Mion, PLLC; Richard C. Turner

(57) ABSTRACT

A field winding rotating electrical machine includes a field current detection section, a field current control section configured to calculate a duty ratio of a current supplied to the field winding based on a field current detection value, to thereby control current supply to the field winding by using a switching element, and a field current correction section configured to estimate a time point when the field current becomes 0 A based on a control state of the field current, to specify the field current detection value at the estimated time point to be a field current correction value, and to subtract the field current correction value from the field current detection value, to thereby calculate the corrected field current value. The field current control section controls the current supply based on the corrected field current value calculated by the field current correction section.

15 Claims, 5 Drawing Sheets

(51) Int. Cl.
*H02P 9/30* (2006.01)
*B60L 11/12* (2006.01)
*H02P 9/48* (2006.01)
*F02N 11/04* (2006.01)
*F02N 11/08* (2006.01)

(52) U.S. Cl.
CPC ............ *F02N 11/04* (2013.01); *F02N 11/0818* (2013.01); *F02N 11/0862* (2013.01); *Y02T 10/642* (2013.01); *Y02T 10/7077* (2013.01)

(56) References Cited

FOREIGN PATENT DOCUMENTS

| | | |
|---|---|---|
| JP | 2009-215887 A | 9/2009 |
| JP | 2010-081709 A | 4/2010 |
| JP | 4449882 B2 | 4/2010 |
| JP | 2010-193539 A | 9/2010 |
| JP | 2012-090404 A | 5/2012 |

* cited by examiner

TIME MEASURING COUNTER VALUE C

FIELD CURRENT DUTY RATIO Df

FIELD CURRENT

FIELD WINDING ROTATING ELECTRICAL MACHINE AND METHOD FOR CONTROLLING FIELD CURRENT OF A FIELD WINDING ROTATING ELECTRICAL MACHINE

CROSS REFERENCE TO RELATED APPLICATIONS

This is a National Stage of International Application No. PCT/JP2012/062401 filed May 15, 2012, the contents of which are incorporated herein by reference in its entirety.

TECHNICAL FIELD

The present invention relates to a field winding rotating electrical machine that is mounted mainly in a vehicle and includes an armature winding and a field winding with a control device, and to a method of controlling a field current of the field winding rotating electrical machine.

BACKGROUND ART

In recent years, for environmental protection and fuel economy improvement, a so-called hybrid car including an engine and another power source such as a rotary generator-motor has been developed for practical use. In this type of vehicle, the engine and another power source are used for different running situations.

Idle reduction, for example, is a technology for reducing unnecessary fuel consumption during idling. In the idle reduction technology, an internal combustion engine is stopped when a vehicle stops at a traffic light or in other situations, and the internal combustion engine is restarted by a rotary generator-motor in response to the detection of a driver's intention to start moving, such as stepping on the accelerator or releasing the brake.

The rotary generator-motor mountable in this type of vehicle is mounted in a manner that can transfer torque to the engine. The rotation speed of the rotary generator-motor thus greatly changes by the driver's accelerator pedal operation and the influence of friction of the engine. As a configuration in which an induced voltage of the rotary generator-motor can be controlled independently of the rotation speed of the engine, there has been adopted a field winding type rotary generator-motor capable of control by a field current instead of using a rotor incorporating a permanent magnet.

In general, as a control method for a power generator mounted in a vehicle, there is employed a method of controlling a voltage of a power source such as a battery connected electrically to the power generator to be a predetermined voltage value. In this case, a load torque is generated in an engine connected to the power generator in accordance with a power generation amount. Therefore, when the power generation amount of the power generator varies based on a state of the vehicle, the load torque on the engine also varies in the same manner.

Therefore, when the power generation amount changes abruptly, the generated load torque also increases abruptly. If the abrupt change of the load torque occurs during idling, engine stall may occur, or if the abrupt change of the load torque occurs during driving, its drivability may be affected badly.

Therefore, depending on situations, it is necessary to control the load torque on the engine to be a predetermined value instead of controlling a power source voltage. For instance, there is a related art in which a load torque in power generation is estimated from its field current and rotation speed, and the field current is controlled so that the load torque becomes a predetermined value, to thereby realize the control of the load torque (see, for example, Patent Literature 1). Therefore, when performing the control as described in Patent Literature 1, it is important to correctly detect the field current in order to control the load torque with high accuracy.

CITATION LIST

Patent Literature

[PTL 1] JP 2010-81709 A

SUMMARY OF INVENTION

Technical Problem

However, the related art has the following problem.

When detecting the field current, there is an error between a detected value and an actual current due to individual variation or aged deterioration of a detection circuit, temperature characteristics, or the like. In particular, an operating temperature of the rotating electrical machine for a vehicle becomes very higher temperature because a rotating electrical machine for a vehicle is usually mounted in an engine room at a place of high temperature near the engine. Therefore, the operating temperature falls within a very wide range, and hence the fluctuation of characteristics due to its temperature condition becomes larger.

In addition, it is possible to construct a detection circuit with less individual variation and good temperature characteristics by using a high performance element for the detection circuit. However, in this case, cost is increased due to the use of the high performance element.

The present invention has been made for solving the above-mentioned problem, and it is an object of the present invention to provide a field winding rotating electrical machine and a method of controlling a field current of the field winding rotating electrical machine, which can realize high accuracy field current control while suppressing the influences of a detection error of the field current in the field winding rotating electrical machine having a field winding.

Solution to Problem

According to one embodiment of the present invention, there is provided a field winding rotating electrical machine, including: an armature winding; a field winding; a field current detection section configured to detect a field current flowing in the field winding; a field current control section configured to calculate a duty ratio of a current supplied to the field winding based on a field current detection value detected by the field current detection section, to thereby control current supply to the field winding by using a switching element; and a field current correction section configured to estimate a time point when the field current becomes 0 A based on a control state of the field current, to specify the field current detection value detected by the field current detection section at the estimated time point to be a field current correction value, and to subtract the specified field current correction value from the field current detection value detected by the field current detection section, to thereby calculate the corrected field current value, in which the field current control section controls the current supply based on the corrected field current value calculated by the field current correction section.

In addition, according to one embodiment of the present invention, there is provided a method of controlling a field current of a field winding rotating electrical machine, the field winding rotating electrical machine including: an armature winding; and a field winding, the method including: a field current detection step of detecting, by a field current detector, a field current flowing in the field winding; a field current control step of calculating a duty ratio of a current supplied to the field winding based on a field current detection value detected in the field current detection step, to thereby control current supply to the field winding by using a switching element; and a field current correction step of estimating a time point when the field current becomes 0 A based on a control state of the field current, specifying the field current detection value detected in the field current detection step at the estimated time point to be a field current correction value, and subtracting the specified field current correction value from the field current detection value detected in the field current detection step, to thereby calculate the corrected field current value, in which the field current control step includes controlling the current supply based on the corrected field current value calculated in the field current correction step.

Advantageous Effects of Invention

According to the field winding rotating electrical machine and the method of controlling the field current of the field winding rotating electrical machine according to one embodiment of the present invention, a time point when the field current becomes 0 A is estimated based on the control state of the field current, and the field current detection value detected at the estimated time point may be used as the field current correction value for correcting the detection error of the field current. As a result, there may be provided the field winding rotating electrical machine and the method of controlling the field current of the field winding rotating electrical machine, which can realize the high accuracy field current control with the suppressed influence of the detection error of the field current in the field winding rotating electrical machine having the field winding.

DESCRIPTION OF EMBODIMENTS

Now, a field winding rotating electrical machine and a method of controlling a field current of the field winding rotating electrical machine according to exemplary embodiments of the present invention are described with reference to the drawings.

First Embodiment

Figure 1:
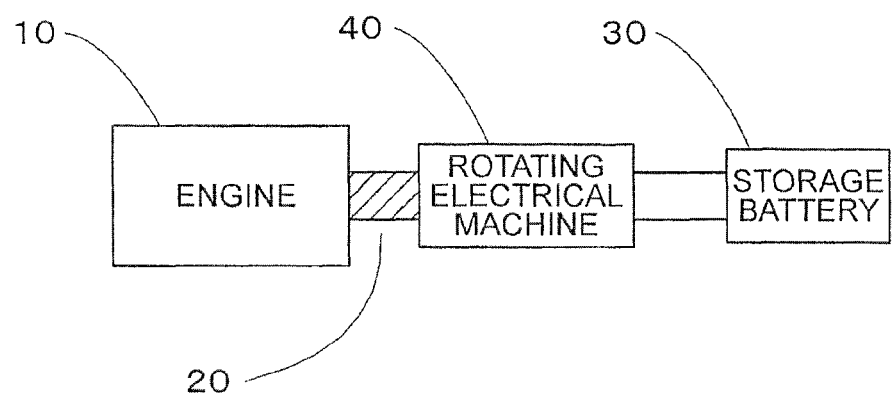
FIG. 1 is an overall configuration diagram schematically illustrating a case where a field winding rotating electrical machine according to a first embodiment of the present invention is mounted in a vehicle.

FIG. 1 is an overall configuration diagram schematically illustrating a case where a field winding rotating electrical machine according to a first embodiment of the present invention is mounted in a vehicle. A drive source includes an engine 10 and a rotating electrical machine 40 (corresponding to a field winding synchronous generator-motor, which is referred to as the rotating electrical machine 40 in the following description). Further, the engine 10 and the rotating electrical machine 40 are coupled to each other directly or via coupling means 20 such as a belt or a pulley so that the engine 10 and the rotating electrical machine 40 can transfer a torque to each other.

In addition, the rotating electrical machine 40 is electrically connected to a storage battery 30. The storage battery 30 may be a storage battery shared by other loads for the vehicle or may be a storage battery dedicated for the rotating electrical machine 40.

Figure 2:
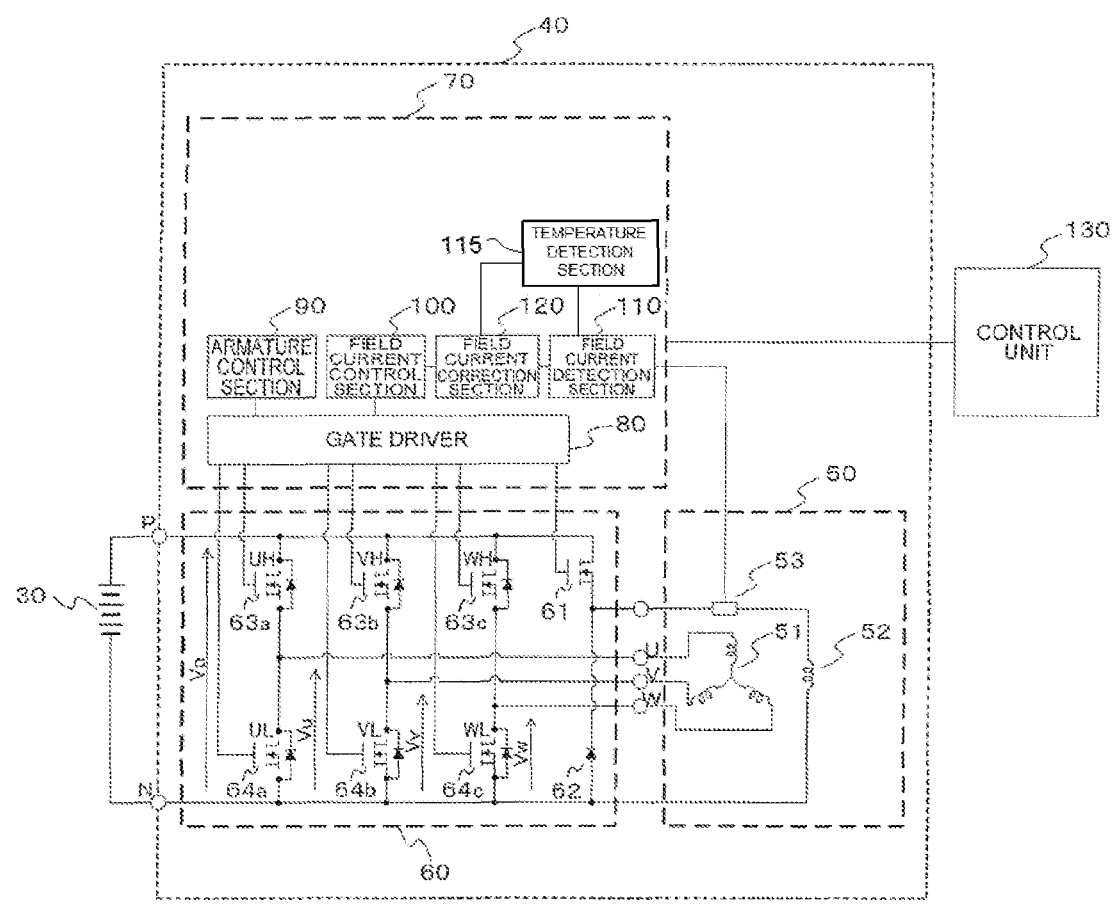
FIG. 2 is a structural diagram of the field winding rotating electrical machine according to the first embodiment of the present invention.

Next, an electrical connection structure of the rotating electrical machine 40 is described. FIG. 2 is a structural diagram of the field winding rotating electrical machine according to the first embodiment of the present invention. As illustrated in FIG. 2, the rotating electrical machine 40 includes a motor/generator unit 50, a power conversion unit 60, and a control section 70.

The motor/generator unit 50 includes a three-phase Y-connected or Δ-connected armature winding 51, a field winding 52, and a current detector 53. Note that, the armature winding 51 may have a connection other than the three-phase connection.

The power conversion unit 60 is a so-called three-phase inverter, which includes six power conversion switching elements 63a to 63c and 64a to 64c connected to individual phases of the armature winding 51 of the motor/generator unit 50, a field winding current control switching element 61 connected to the field winding 52 of the motor/generator unit 50, and a flywheel diode 62.

The control section 70 includes a gate driver 80, an armature control section 90, a field current control section 100, a field current detection section 110, and a field current correction section 120. The gate driver 80 drives individual switching elements of the power conversion unit 60.

The armature control section 90 controls ON/OFF timings of the power conversion switching elements 63a to 63c and 64a to 64c of the power conversion unit 60 connected to the armature winding 51 of the motor/generator unit 50.

The field current control section 100 determines an ON/OFF timing of the field winding current control switching element 61 for controlling the field current to be supplied to the field winding 52 of the motor/generator unit 50.

Here, the gate driver 80 is configured to control the drive and the power generation of the motor/generator unit 50 by driving the power conversion switching elements 63a to 63c and 64a to 64c and the field winding current control switching element 61 based on an ON/OFF command sent to the armature winding 51 and the field winding 52 from the armature control section 90 and the field current control section 100.

In addition, the field current detection section 110 detects a current flowing in the field winding 52 by the current detector 53. In addition, the field current correction section 120 performs correction calculation of a field current detection value Iraw detected by the field current detection section 110.

Further, the control section 70 is connected to a control unit 130, which is arranged outside the rotating electrical machine 40, and receives an operation command such as a power generation command or a drive command from the control unit 130. For instance, if the command sent from the control unit 130 is the power generation command, the control section 70 transits the rotating electrical machine 40 to a power generation mode for performing a power generation operation. On the other hand, if the command is the drive command, the control section 70 transits the rotating electrical machine 40 to a drive mode for performing a drive operation.

In addition, if neither the power generation command nor the drive command is transmitted from the control unit 130, the control section 70 transits the rotating electrical machine 40 to a halt mode in which neither the armature control nor field current control is performed. Further, the control section 70 transits the rotating electrical machine 40 to the halt mode also if a stop command is transmitted from the control unit 130.

Figure 3:
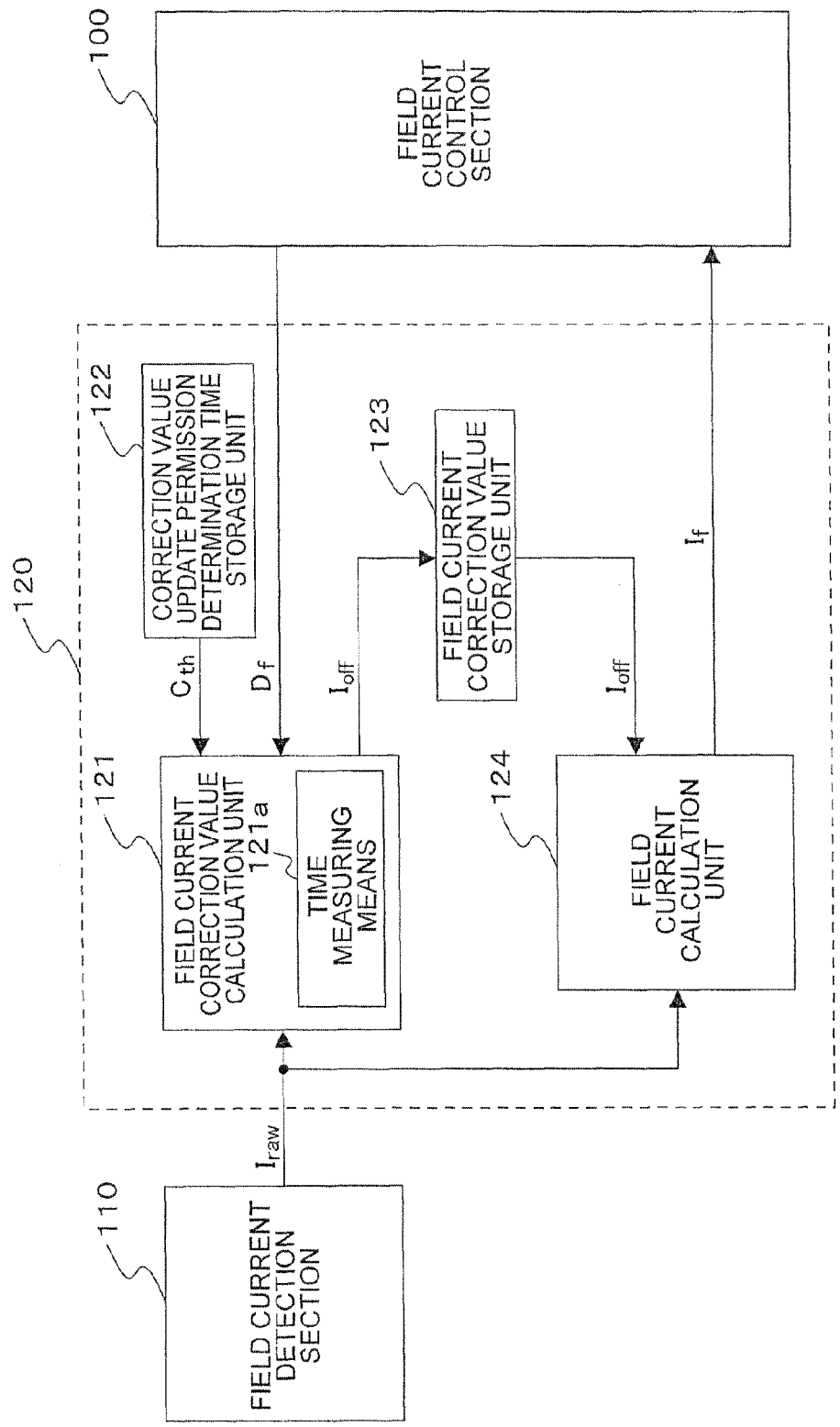
FIG. 3 is a structural diagram of a field current correction section according to the first embodiment of the present invention.

Next, an operation of the field current correction section 120 as a technical feature of the present invention is described in detail. FIG. 3 is a structural diagram of the field current correction section 120 according to the first embodiment of the present invention. As illustrated in FIG. 3, the field current correction section 120 includes a field current correction value calculation unit 121, a correction value update permission determination time storage unit 122, a field current correction value storage unit 123, and a field current calculation unit 124.

The field current correction value calculation unit 121 specifies the field current detection value Iraw detected when the current flowing in the field winding 52 is 0 A to be a field current correction value Ioff, and includes time measuring means 121a. The correction value update permission determination time storage unit 122 is a storage unit that stores a correction value update permission determination count value Cth in advance.

The field current correction value storage unit 123 is a storage unit for storing the field current correction value Ioff calculated by the field current correction value calculation unit 121. In addition, the field current calculation unit 124 calculates a field current value If by correcting the field current detection value Iraw based on the field current correction value Ioff.

Figure 4A:
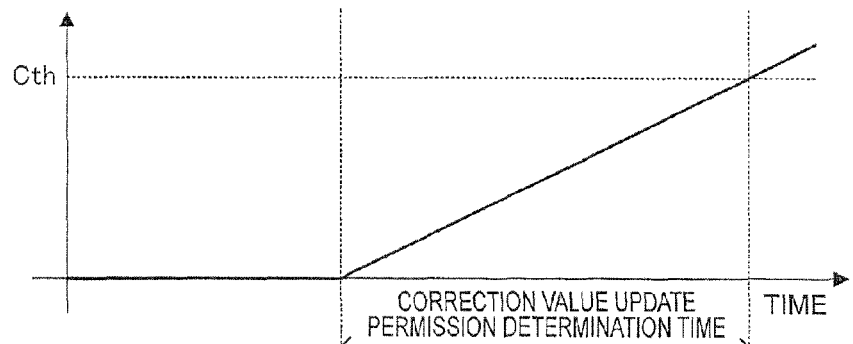
FIGS. 4(a)-(c) are diagrams showing temporal changes of a time measuring counter, a field current duty ratio, and a field current in the field current correction section according to the first embodiment of the present invention.
Figure 4B:
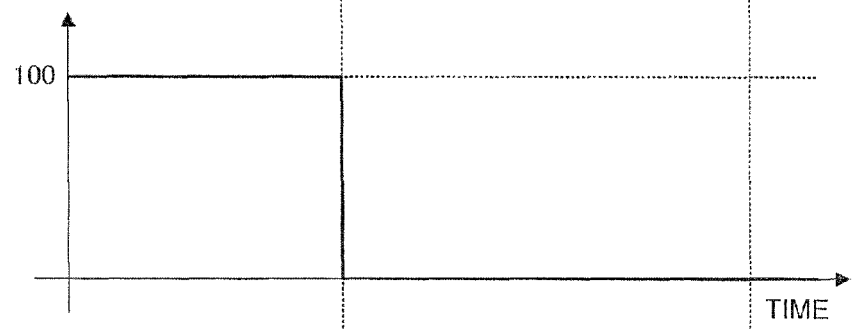
Figure 4C:
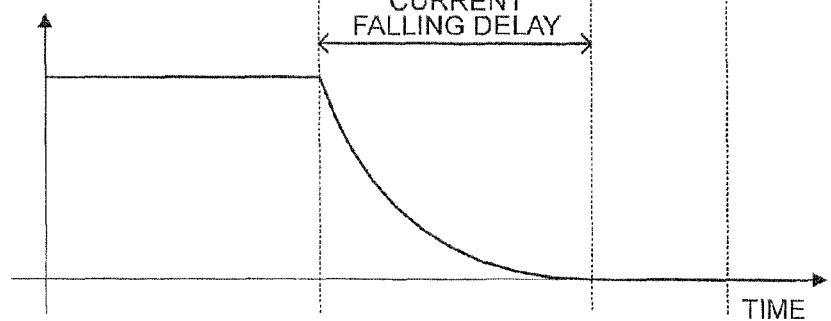

Next, there is described a method of determining whether or not the current flowing in the field winding 52 is 0 A in the field current correction value calculation unit 121. FIG. 4 are diagrams showing temporal changes of a time measuring counter, a field current duty ratio, and a field current in the field current correction section 120 according to the first embodiment of the present invention. In the following description, FIG. 4 are referred to as necessary.

First, the field current correction value calculation unit 121 receives a duty ratio Df of a PWM signal (hereinafter referred to as a field current duty ratio Df) so as to determine whether or not the field current duty ratio Df is 0%, the PWM signal being used for commanding ON/OFF of the field winding current control switching element 61 so that the field current control section 100 controls the field current.

If the field current duty ratio Df is not 0%, the time measuring means 121a in the field current correction value calculation unit 121 clears a time measuring count value C to be 0. On the other hand, if the field current duty ratio Df is 0%, the time measuring means 121a counts up the time measuring count value C.

Then, the field current correction value calculation unit 121 repeats the above-mentioned operation using the time measuring means 121a every predetermined time so as to measure duration time of the state where the field current duty ratio Df is 0%. If the state where the field current duty ratio Df is 0% continues, the time measuring counter C is sequentially counted up as shown in FIG. 4(*a*).

Next, if the time measuring counter C is counted up, the field current correction value calculation unit 121 determines whether or not the time measuring count value C reaches the correction value update permission determination count value Cth read out from the correction value update permission determination time storage unit 122. Then, if the time measuring count value C has reached the correction value update permission determination count value Cth, the field current correction value calculation unit 121 determines (estimates) that the current flowing in the field winding 52 is 0 A.

Here, the correction value update permission determination count value Cth is set to a count value such as to secure a time period sufficiently longer than a time constant of the field winding 52. This is because, for example, when the field current duty ratio Df is changed from 100% to 0% as shown in FIG. 4(*b*), a current flowing in the field winding does not promptly become 0 A, but the current decreases in accordance with a time constant determined by resistance and inductance of the field winding as shown in FIG. 4(*c*).

In other words, even if the field current duty ratio Df is 0%, the current flowing in the field winding 52 is not always 0 A. Therefore, as shown in FIG. 4, it is necessary to set the correction value update permission determination count value Cth to a value larger than the time constant of the field winding 52 so as to secure a time period in which the current flowing in the field winding is reliably converged to 0 A.

When the time measuring counter C reaches the correction value update permission determination count value Cth, the field current correction value calculation unit 121 reads the field current detection value Iraw from the field current detection section 110. Here, as described above, when the time measuring counter C reaches the correction value update permission determination count value Cth, the current flowing in the field winding 52 (actual current) is reliably 0 A. Therefore, it can be said that the field current detection value Iraw at this time is a detection value obtained when the current is 0 A.

Therefore, the field current correction value calculation unit 121 controls the field current correction value storage unit 123 to store, as the field current correction value Ioff, the field current detection value Iraw at this time that is the detection value obtained when the current is 0 A.

Then, the field current calculation unit 124 subtracts the field current correction value Ioff stored in the field current correction value storage unit 123 from the field current detection value Iraw so as to calculate the field current value If with the corrected error. Further, the field current calculation unit 124 transmits the calculated field current value If to the field current control section 100. As a result, the field current control section 100 can perform current supply control to the field winding 52 by the corrected field current value If.

As described above, according to the first embodiment, the correction value is calculated as the field current detection value obtained when the state where the duty ratio of the PWM signal for commanding the ON/OFF of the field winding current control switching element for controlling the field current is 0% continues for a time period sufficiently longer than the time constant of the field winding, namely, obtained in the state where the field current becomes reliably 0 A. Therefore, the field current control can be performed by using the field current detection value corrected by the correction value. Thus, it is possible to realize high accuracy field current control with correction of the detection error generated by an individual variation or aged deterioration of the current detection circuit, or temperature characteristics.

Second Embodiment

In the first embodiment described above, there is described the case where the duty ratio of the PWM signal supplied to the field winding is monitored so as to determine that the current does not flow in the field winding (namely, the time point when the field current becomes 0 A is estimated). In contrast, in a second embodiment of the present invention, there is described a method of determining that the field current does not flow based on an operation mode of the rotating electrical machine.

Figure 5:
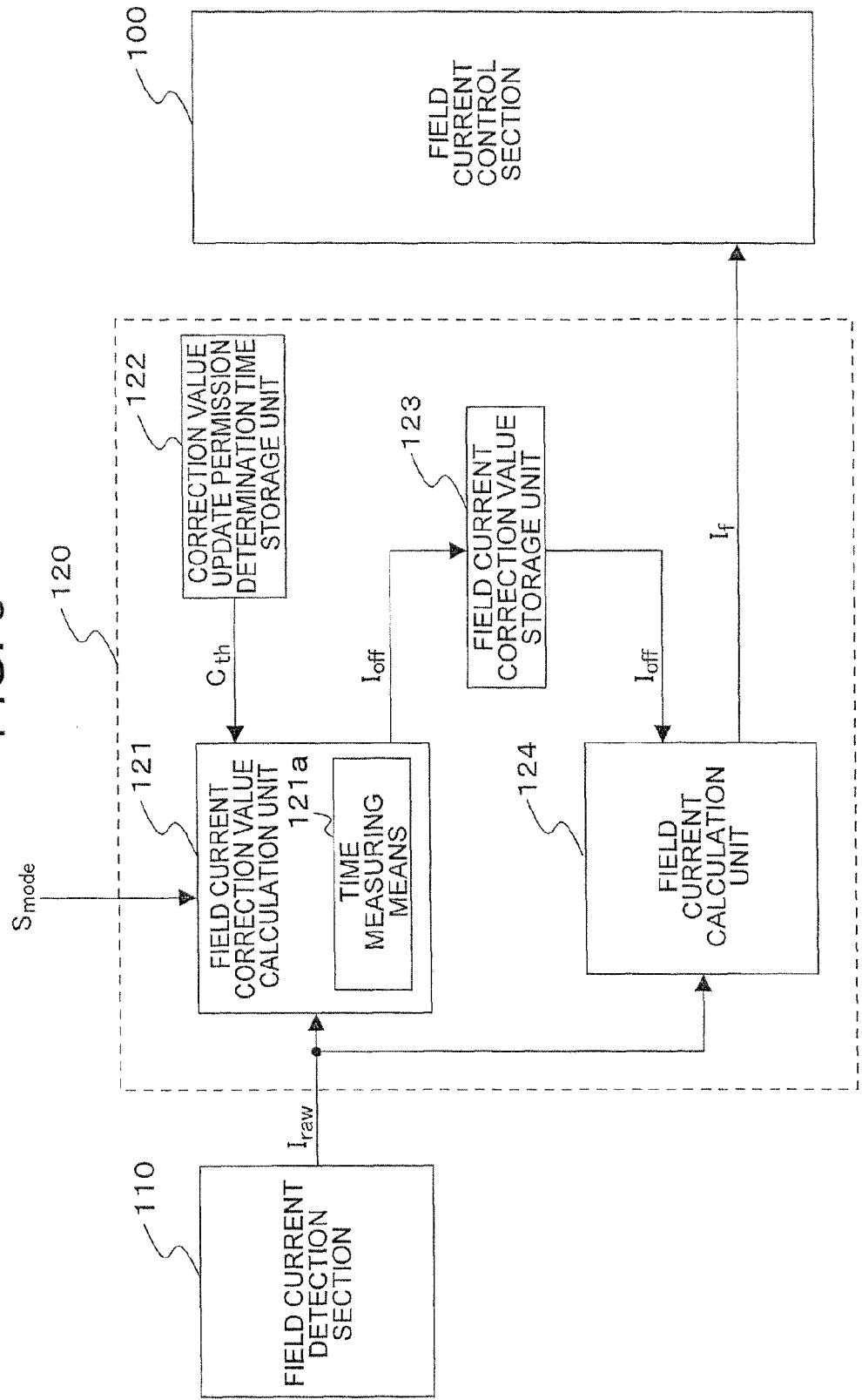
FIG. 5 is a structural diagram of a field current correction section according to a second embodiment of the present invention.

FIG. 5 is a structural diagram of the field current correction section 120 according to the second embodiment of the present invention. A structure of the field current correction section 120 illustrated in FIG. 5 of the second embodiment is basically the same as the structure of the field current correction section 120 illustrated in FIG. 3 of the first embodiment described above. However, the second embodiment is different in that instead of reading the field current duty ratio Df from the field current control section 100, the field current correction value calculation unit 121 reads, based on the operation command from the control unit 130, a mode signal Smode for determining which mode the operation mode transits among the power generation mode, the halt mode, and the like that are determined by the control section 70.

In general, the rotating electrical machine 40 mounted in the vehicle always receives the power generation command during operation of the engine in order to compensate for power consumption of the vehicle and charges the storage battery. However, when the rotating electrical machine 40 performs the power generation operation, a negative torque is generated for the engine.

Therefore, as a method of managing electric power in the vehicle, it is considered to perform the following control. Specifically, for instance, when the vehicle reduces speed, namely, when a negative torque is necessary for the engine, the power generation is actively performed to generate power larger than power consumed by the vehicle, whereas, in a situation where it is required to reduce a load on the engine for accelerating the engine, the power generation is not performed even during operation of the engine.

In other words, it is considered that no operation command of the power generation command or the drive command may be received or the stop command may be received from the control unit 130 even during operation of the engine. In this case, the control section 70 transits the rotating electrical machine 40 to the halt mode. When changing the halt mode, the control section 70 neither performs the armature control nor the field current control. Therefore, the field current becomes 0 A except for a falling delay time of the current due to field winding characteristics just after changing the halt mode.

This is because it is considered that, just after changing the halt mode, a current may be supplied to the field winding in the last operation mode. Therefore, if the halt mode in which a current is not supplied to the field winding continues for a time period sufficiently longer than the time constant of the field winding, the current flowing in the field winding can be determined to be 0 A.

Therefore, in the second embodiment, the duration time of the state where the mode signal Smode indicates the halt mode is measured by the time measuring means 121a. When the measured time reaches a time corresponding to the correction value update permission determination count value Cth stored in advance in the correction value update permission determination time storage unit 122, the field current correction value Ioff is calculated and is written in the field current correction value storage unit 123.

As described above, according to the second embodiment, when the mode in which the rotating electrical machine performs no operation for supplying a current to the field winding such as the power generation operation or the drive operation continues for a time period sufficiently longer than the time constant of the field winding, it is determined that the field current has reliably become 0 A. Thus, the same effect as that of the first embodiment described above can be obtained.

Note that, in the second embodiment described above, it is determined that the current does not flow in the field winding based on the operation mode of the rotating electrical machine. In contrast, for example, if the vehicle is equipped with an idle reduction system, the same effect can be obtained by the following determination.

When the vehicle performs idle reduction, the rotation speed of the rotating electrical machine 40 coupled to the engine becomes zero, and the power generation operation or the drive operation accompanying current supply to the field winding is not performed. Therefore, for example, when receiving information representing whether or not the vehicle is in idle reduction from the control unit 130, if the duration time of the idle reduction (namely, the state where no current is supplied to the field winding) continues for a time period sufficiently longer than the time constant of the field winding, it is possible to determine that the current flowing in the field winding is 0 A.

In addition, in the first embodiment and the second embodiment described above, the correction value of the field current is calculated when it is determined that the current of the field winding is 0 A. However, the present invention is not limited to this case. For instance, it is possible to detect an ambient temperature of the field current detection section 110 and to add a condition whether or not to calculate the correction value depending on the ambient temperature.

Generally, it is considered that errors of the field current detection section 110 are caused due to an individual variation, aged deterioration, and temperature characteristics. Among the above-mentioned factors, the error due to the individual variation or the aged deterioration is considered not to vary in short time. There is thus no problem, for example, even when the correction value is calculated only once after turning on the power of the rotating electrical machine and no correction is made thereafter.

On the other hand, the error due to the temperature characteristics becomes outstanding when a temperature varies. Therefore, if a variation amount of the temperature from the last time the correction value is calculated is small, it is not necessary to calculate the correction value many times. Therefore, for example, if the ambient temperature of the field current detection section 110 varies within a predetermined range from the ambient temperature of the last time the correction value is calculated (if the detection error is within a permissible range), the correction value is not calculated. Thus, unnecessary calculation can be eliminated.

The invention claimed is:
1. A field winding rotating electrical machine, comprising:
   an armature winding;
   a field winding;
   a field current detection section configured to detect a field current flowing in the field winding;
   a field current control section configured to calculate a duty ratio of a current supplied to the field winding based on a field current detection value detected by the field current detection section, to thereby control current supply to the field winding by using a switching element; and a field current correction section configured to estimate a time point when the field current becomes 0 A based on a control state of the field current, to specify the field current detection value detected by the field current detection section at the estimated time point to be a field current correction value, and to subtract the specified field current correction value from the field current detection value detected by the field current detection section, to thereby calculate the corrected field current value, wherein the field current control section controls the current supply based on the corrected field current value calculated by the field current correction section.

2. A field winding rotating electrical machine according to claim 1, wherein the field current correction section estimates a time point when a state where the duty ratio calculated by the field current control section is zero, which corresponds to the control state of the field current, continues for a predetermined time period to be the time point when the field current becomes 0 A, and specifies the field current correction value.

3. A field winding rotating electrical machine according to claim 2, wherein the predetermined time period used by the field current correction section is set to a value based on a time constant of the field winding.

4. A field winding rotating electrical machine according to claim 3, further comprising a temperature detection section configured to detect ambient temperature of the field current detection section, wherein the field current correction section stores the ambient temperature detected by the temperature detection section when the field current correction value is specified as ambient temperature of the correction, wherein when the ambient temperature detected by the temperature detection section is within a predetermined range from the ambient temperature of the correction, the field current correction section avoids specifying the field current correction value, and wherein when the ambient temperature detected by the temperature detection section is outside the predetermined range from the ambient temperature of the correction, the field current correction section specifies the field current correction value.

5. A field winding rotating electrical machine according to claim 2, further comprising a temperature detection section configured to detect ambient temperature of the field current detection section, wherein the field current correction section stores the ambient temperature detected by the temperature detection section when the field current correction value is specified as ambient temperature of the correction, wherein when the ambient temperature detected by the temperature detection section is within a predetermined range from the ambient temperature of the correction, the field current correction section avoids specifying the field current correction value, and wherein when the ambient temperature detected by the temperature detection section is outside the predetermined range from the ambient temperature of the correction, the field current correction section specifies the field current correction value.

6. A field winding rotating electrical machine according to claim 1, wherein in a case where a control mode includes: as the control modes, one or more operation modes, to which the mode transits in accordance with an operation command sent from outside; and a halt mode in which current supply control to the armature winding and the field winding is not performed, the field current correction section estimates a time point when one of a state where the control mode is not one of the operation mode and the halt mode and a state of the halt mode as the control state of the field current continues for a predetermined time period to be the time point when the field current becomes 0 A, and specifies the field current correction value.

7. A field winding rotating electrical machine according to claim 6, wherein the predetermined time period used by the field current correction section is set to a value based on a time constant of the field winding.

8. A field winding rotating electrical machine according to claim 7, further comprising a temperature detection section configured to detect ambient temperature of the field current detection section, wherein the field current correction section stores the ambient temperature detected by the temperature detection section when the field current correction value is specified as ambient temperature of the correction, wherein when the ambient temperature detected by the temperature detection section is within a predetermined range from the ambient temperature of the correction, the field current correction section avoids specifying the field current correction value, and wherein when the ambient temperature detected by the temperature detection section is outside the predetermined range from the ambient temperature of the correction, the field current correction section specifies the field current correction value.

9. A field winding rotating electrical machine according to claim 6, further comprising a temperature detection section configured to detect ambient temperature of the field current detection section, wherein the field current correction section stores the ambient temperature detected by the temperature detection section when the field current correction value is specified as ambient temperature of the correction, wherein when the ambient temperature detected by the temperature detection section is within a predetermined range from the ambient temperature of the correction, the field current correction section avoids specifying the field current correction value, and wherein when the ambient temperature detected by the temperature detection section is outside the predetermined range from the ambient temperature of the correction, the field current correction section specifies the field current correction value.

10. A field winding rotating electrical machine according to claim 1, wherein in a case where a vehicle equipped with an idle stop system performs field current control, the field current correction section estimates a time point when a state where the vehicle performs idle reduction, which corresponds to the control state of the field current, continues for a predetermined time period to be the time point when the field current becomes 0 A, and specifies the field current correction value.

11. A field winding rotating electrical machine according to claim 10, wherein the predetermined time period used by the field current correction section is set to a value based on a time constant of the field winding.

12. A field winding rotating electrical machine according to claim 11, further comprising a temperature detection section configured to detect ambient temperature of the field current detection section, wherein the field current correction section stores the ambient temperature detected by the temperature detection section when the field current correction value is specified as ambient temperature of the correction, wherein when the ambient temperature detected by the temperature detection section is within a predetermined range from the ambient temperature of the correction, the field current correction section avoids specifying the field current correction value, and wherein when the ambient temperature detected by the temperature detection section is outside the predetermined range from the ambient temperature of the correction, the field current correction section specifies the field current correction value.

13. A field winding rotating electrical machine according to claim 10, further comprising a temperature detection section configured to detect ambient temperature of the field current detection section, wherein the field current correction section stores the ambient temperature detected by the temperature detection section when the field current correction value is specified as ambient temperature of the correction, wherein when the ambient temperature detected by the temperature detection section is within a predetermined range from the ambient temperature of the correction, the field current correction section avoids specifying the field current correction value, and wherein when the ambient temperature detected by the temperature detection section is outside the predetermined range from the ambient temperature of the correction, the field current correction section specifies the field current correction value.

14. A field winding rotating electrical machine according to claim 1, further comprising a temperature detection section configured to detect ambient temperature of the field current detection section, wherein the field current correction section stores the ambient temperature detected by the temperature detection section when the field current correction value is specified as ambient temperature of the correction, wherein when the ambient temperature detected by the temperature detection section is within a predetermined range from the ambient temperature of the correction, the field current correction section avoids specifying the field current correction value, and wherein when the ambient temperature detected by the temperature detection section is outside the predetermined range from the ambient temperature of the correction, the field current correction section specifies the field current correction value.

15. A method of controlling a field current of a field winding rotating electrical machine, the field winding rotating electrical machine comprising:
an armature winding; and
a field winding, the method comprising:

a field current detection step of detecting, by a field current detector, a field current flowing in the field winding;

a field current control step of calculating a duty ratio of a current supplied to the field winding based on a field current detection value detected in the field current detection step, to thereby control current supply to the field winding by using a switching element; and a field current correction step of estimating a time point when the field current becomes 0 A based on a control state of the field current, specifying the field current detection value detected in the field current detection step at the estimated time point to be a field current correction value, and subtracting the specified field current correction value from the field current detection value detected in the field current detection step, to thereby calculate the corrected field current value, wherein the field current control step comprises controlling the current supply based on the corrected field current value calculated in the field current correction step.

* * * * *